United States Patent [19]

Zimmermann

[11] Patent Number: 4,579,236

[45] Date of Patent: Apr. 1, 1986

[54] INSULATING JUG

[75] Inventor: Anso Zimmermann, Bad Hersfeld, Fed. Rep. of Germany

[73] Assignee: Rotpunkt Dr. Anso Aimmermann, Nied Eraula, Fed. Rep. of Germany

[21] Appl. No.: 603,789

[22] Filed: Apr. 25, 1984

[30] Foreign Application Priority Data

Oct. 20, 1983 [DE] Fed. Rep. of Germany ... 8330274[U]

[51] Int. Cl.⁴ ............................................. A47J 41/00
[52] U.S. Cl. .................................. 215/13 R; 215/12 A; 215/100 R; 99/295; 99/319
[58] Field of Search ................ 215/13 R, 13 A, 12 A, 215/100 R, 101; 206/0.5; 99/317-323, 295

[56] References Cited

U.S. PATENT DOCUMENTS

| 2,004,883 | 6/1935 | Wolcott | 99/319 X |
| 2,072,934 | 3/1937 | Wolcott | 215/100 R |
| 2,284,087 | 5/1942 | Ferguson | 99/319 X |
| 2,328,599 | 7/1943 | Armstrong | 99/319 X |
| 2,905,074 | 9/1959 | Newman | 99/319 X |
| 3,189,229 | 6/1965 | Carroll et al. | 215/12 A X |
| 3,710,901 | 1/1973 | Guard et al. | 190/107 |

FOREIGN PATENT DOCUMENTS

| 15683 | 10/1890 | United Kingdom | 99/319 |
| 16722 | 8/1892 | United Kingdom | 99/319 |
| 770275 | 3/1957 | United Kingdom | 215/13 A |

Primary Examiner—William Price
Assistant Examiner—Sue A. Weaver
Attorney, Agent, or Firm—Lewis H. Eslinger

[57] ABSTRACT

An insulating jug 1 for storing liquids and comprising a protective housing 2, an inner receiving housing and a lid 3, closing the jug opening, is outlined.

The insulating jug 1 is provided with hanging means 7, in the proximity of the opening in the housing 2, cover 3 or on a jug handle 4, to which the string of a tea bag or the like can be attached to enable infusion to be carried out in the jug and thereafter readily to enable removal of the used tea bag. The hanging means 7 is preferably formed in one piece with a base piece 9 and top piece 8. In the described embodiment, base piece 9 is inserted in a recess 6 and located therein by a locating device 14. The tea bag string is received in a slot 17 formed in the top piece 8 and held by an end piece of the string engaging the top piece at the slot outlet. Alternatively, the top piece may be undercut to retain the string.

8 Claims, 3 Drawing Figures

U.S. Patent  Apr. 1, 1986  4,579,236

INSULATING JUG

TECHNICAL FIELD OF THE INVENTION

The subject of the invention is an insulating jug according to the pre-characterizing part of claim 1.

BRIEF DESCRIPTION OF THE PRIOR ART

Such generally known insulating jugs serve to keep drinks, for example tea, hot and in readiness. They consist of an inner receiving housing for the tea and of a protective housing, chiefly of plastics material or metal, which surrounds the receiving housing, with insulation between the housing, which ensures that the tea kept in readiness remains hot for a relatively long time.

An appropriately common use of such an insulating jug consists in that tea to be provided is prepared in another vessel and, while still hot, is poured into the insulating jug wherein, after the closure of the jug by a lid, the tea stays hot for several hours. Tea bags are very frequently used for the preparation of the tea.

Using the insulating jug itself as the infusion vessel is problematic for the reason that when conventional tea bags with strings are used, there is no suitable holding device for the tea bag strings with which the tea bags can be extracted after infusion has taken place.

OBJECT OF THE INVENTION

The object underlying the invention is to develop an insulating jug of the afore-mentioned type in such a way that it can be used without any problems to infuse tea or the like using bags having strings.

SUMMARY OF THE INVENTION

This object is achieved through a development according to claim 1. Such a development allows the free end or the free ends of the tea bag strings to be secured during infusion so that the bag(s) may be extracted with ease after infusion. A slot with a shoulder formed by the slot outlet for tea bag strings with end pieces on their free ends serves this purpose. In order to secure looped tea bag strings, an undercut projection around which the loop is to be placed is provided. Of course, it is also possible to loop the afore-mentioned tea bag strings with end pieces around the projection. The distance between the hanging means and the opening is less than the length of the string in order to ensure that the bag is immersed. It is also possible to arrange the hanging means on the handle or cover of the insulating jug.

The development of claim 1 enables the hanging means to be mounted as separate component part simply and quickly on the protective housing, allowance having to be made for the fact that moulding in one piece is relatively difficult and may entail expensive tools.

The developments according to claims 1 and 6 result in a secure mounting for the hanging means, which is provided on the basis of engagement in a recess. According to claim 6, the locating device is disposed inside the recess where it is non-interfering and non-fouling.

Claims 5 and 1 relate to advantageous shapings for insertable hanging means which are easy to handle and which even in the case of a single-piece construction are easy to manufacture.

In order to secure a tea bag string with end piece, there is the development according to claim 2, the tea bag string being held by engaging over the slot outlet edges or by being trapped or held in an undercut.

The developments according to claim 1 and 7 in each case produce a step in the slot, which makes it difficult for the string to leave the slot unintentionally. Before the string is removed intentionally, it has to be brought to the center of the slot. This measure is facilitated by the development according to claim 7 as the rounded wall faces prove to be guiding faces.

The measure which may be learned from claim 1 facilitates insertion of the string.

In order to economize on weight and, naturally, also on material, the wall thickness of the protective housing is ordinarily kept to a minimum. Enclosing the hanging means in the protective housing is, therefore, problematic. The idea contained in claim 1 is of help here. At the point specified there is more room which makes possible the afore-mentioned engagement in a recess. This advantage should also be mentioned in connection with the engagement of the hanging means in the cover or in the handle (claim 1).

A development according to claim 3 is advantageous for ergonomic reasons, in this case for right-handed people. At the point specified the string can be guided in and out respectively with ease, in one instance by one and the same hand or in the other instance also by the left hand.

The material specified in claim 4 is advantageously used for reasons relating to hygiene and manufacturing techniques.

BRIEF DESCRIPTION OF THE DRAWINGS

An exemplary embodiment of the invention is described in greater detail below with reference to the drawing, in which.

DETAILED DESCRIPTION OF THE PREFERRED EMBODIMENT OF THE INVENTION

Figure 1:
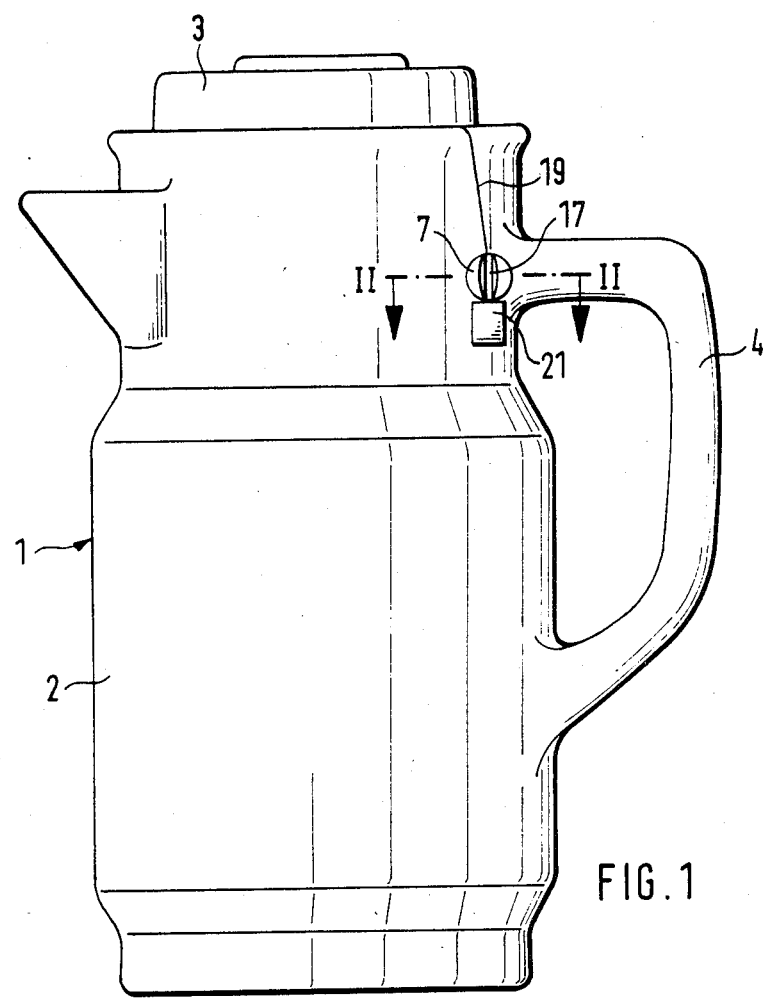
FIG. 1 shows a lateral view of an insulating jug.
Figure 2:
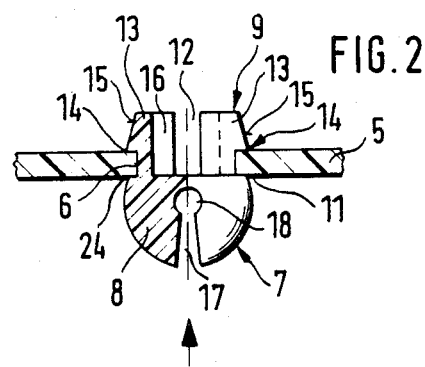
FIG. 2 shows a partial section on the line II—II in FIG. 1.
Figure 3:
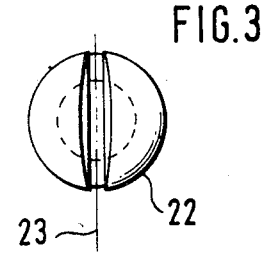
FIG. 3 shows a bottom plan view of the representation according to FIG. 2.

The insulating jug 1 represented in FIG. 1 has in the usual manner a protective housing 2 consisting of plastics material, a lid or cover 3, which seals an opening (not visible) and a handle 4. An inner receiving housing which serves to receive the liquid is likewise not visible.

In the transition area between the protective housing 2 and the handle 4 there is in the wall 5 of the protective housing 2 a hole 6 in which a hanging means 7 is located.

The hanging means 7 consists of a top piece 8 in the form of a spherical segment and of a cylindrical base piece 9 which emerges in one piece from the top piece 8 and which sits on the segment face 11. The base piece 9 is divided by a central groove 12 into two locating lugs 13 which carry on their circumference locating edges 14 with lead in slopes 15. The locating edges 14 catch behind the inside hole edge of the wall 5.

When the hanging means 7 is located, the locating lugs 13 are able to bend in flexibly as a result of the existence on the one hand of the groove 12 and on the other hand of an axial blind bore 16 since the hanging means 7 consists of flexible plastics material.

In the top piece 8 of the hanging means 7 there is a vertical slot 17 which, in a cross section, diverges outwardly. The base of the slot 17 is formed by a slot enlargement 18 in the form of a bore.

In FIG. 1 there is discernible the outline of a tea bag string 19 which passes through the slot enlargement 18 and which with an end piece 21 engages under the hanging means 7. The surface 22 of the top piece 8 extends in the area of the lower slot outlet substantially at right angles to the longitudinal axis 23 of the slot 17. This ensures that the tea bag string 19 is secured in the slot 17 in a satisfactory manner.

As opposed to the exemplary embodiment described above, it is also possible to use a slotted hanging means 7. Namely, it is possible to loop a tea bag string 19 with end piece 21 or a looped tea bag string around the top piece 8, the free cut 24 there ensuring that the tea bag string does not slip off. There is a free cut 24 because the section face 11 is spaced apart from the center of the spherical top piece 8.

What is claimed is:

1. An insulating jug for storing liquids, having on the top surface an opening which may be sealed by a lid, and including an inner receiving housing and a protective housing made of plastics, and a handle being joined therewith, characterized in that there is arranged in the proximity of the opening on the outside of the protective housing a hanging means formed by a slot, that the hanging means is secured to said protective housing by a locating device, that there is provided a rounded transition area between the protective housing and the handle, that the protective housing has a recess for receiving the hanging means, that the recess is arranged in the rounded transition area, that the hanging means consists of a top and a base piece which are joined together in one piece, the slot being formed on the top piece and the locating device being formed on the base piece, that the base piece is slotted in the center, and both base piece parts form locating lugs with radial locating edges, that the radial locating edges of the lugs cooperate with an inner edge of the recess formed in the protective housing at the rounded transition area for retaining the hanging means therein, that the base of the slot is adjacent the base piece and is formed with a slot enlargement and that the slot diverges outwardly from the slot enlargement.

2. An insulating jug according to claim 1, characterized in that the edges of the hanging means on the lower slot outlet run substantially at right angles to the longitudinal axis of the slot.

3. An insulating jug according to claim 1, characterized in that the hanging means seen from the handle is arranged on the left next to the handle.

4. An insulating jug according to claim 1, characterized in that the hanging means consists of plastics material.

5. An insulating jug according to claim 1, characterized in that the top piece is in the form of a spherical segment, the base piece being arranged on the segment face.

6. An insulating jug according to claim 1, characterized in that the locating device is formed inside the recess.

7. An insulating jug according to claim 1, characterized in that the base of the slot is rounded in the form of a bore.

8. An insulating jug according to claim 1, characterized in that the edges of the hanging means on the lower slot outlet are undercut.

* * * * *